US006962068B2

(12) United States Patent
Villanueva

(10) Patent No.: US 6,962,068 B2
(45) Date of Patent: Nov. 8, 2005

(54) NUT INSERT INSTALLATION SYSTEM AND METHOD OF USE

(75) Inventor: Ramon C. Villanueva, Palmdale, CA (US)

(73) Assignee: AVK Industrial Products, Valencia, CA (US)

( * ) Notice: Subject to any disclaimer, the term of this patent is extended or adjusted under 35 U.S.C. 154(b) by 187 days.

(21) Appl. No.: 10/698,975

(22) Filed: Oct. 31, 2003

(65) Prior Publication Data

US 2005/0091814 A1 May 5, 2005

(51) Int. Cl.[7] ......................... B23K 21/02; B23K 9/20; B21J 15/24

(52) U.S. Cl. ............... 72/391.4; 72/391.8; 29/243.523; 29/243.526; 29/243.53; 228/110; 219/98

(58) Field of Search .................... 29/243.521, 243.522, 29/243.523, 243.524, 243.525, 243.526, 29/243.527, 243.528, 243.529, 243.53, 243.54; 72/391.4, 391.8; 228/110; 219/98, 99

(56) References Cited

U.S. PATENT DOCUMENTS

| | | | | |
|---|---|---|---|---|
| 2,437,191 A | | 3/1948 | Gill | |
| 3,245,137 A | | 4/1966 | Neuschotz et al. | |
| 3,704,506 A | * | 12/1972 | Orr et al. | 29/243.54 |
| 3,747,382 A | * | 7/1973 | McMaster et al. | 72/56 |
| 3,961,739 A | * | 6/1976 | Leftheris | 228/110 |
| 4,002,876 A | | 1/1977 | Wieland, Jr. | |
| 4,070,889 A | | 1/1978 | DeCaro | |
| 4,368,631 A | | 1/1983 | Tanikawa | |
| 4,574,612 A | | 3/1986 | Tanikawa | |
| 4,594,495 A | | 6/1986 | Glorioso | |
| 4,612,793 A | | 9/1986 | Klein | |
| 4,850,772 A | | 7/1989 | Jenkins | |
| 5,605,070 A | | 2/1997 | Wille | |
| 6,272,899 B1 | | 8/2001 | Bentivogli | |

* cited by examiner

*Primary Examiner*—David B. Jones
(74) *Attorney, Agent, or Firm*—Klein, DeNatale, Goldner, et al.; James M. Duncan

(57) ABSTRACT

A system is disclosed for installing an insert within an aperture in a workpiece, the workpiece having a first side and a second side. The insert is the type in which a portion of the insert plastically deforms on the second side of the workpiece upon application of a linear force provided by a tool, thereby preventing withdrawal of the insert from the aperture. The insert comprises a sleeve member and an integral flange, where the flange has a larger diameter than the aperture. The disclosed installation system performs two actions. It causes the expansion of the sleeve and it also causes the flange of the insert to be fused or welded to the first side of the workpiece. The welded connection between the insert and the workpiece prevents any rotation or spinning of the insert within the workpiece, and increases the integrity of the insert-fastener connection.

50 Claims, 3 Drawing Sheets

NUT INSERT INSTALLATION SYSTEM AND METHOD OF USE

BACKGROUND OF THE INVENTION

The present invention relates to an apparatus and method for attaching nut inserts to a workpiece, the workpiece having a first side and a second. Usually the first side is a visible side and the second side is a blind side, meaning there is no access to the second side. More particularly, this invention relates to an installation system which is capable of expanding the body of the insert such that the insert cannot be withdrawn from an aperture within the workpiece, while, nearly simultaneous to the expanding of the body of the insert, the system fuses the flange portion of the insert to the first side of the work piece, through a fusing process such as resistance welding or capacitor discharge welding.

It is known to use threaded rivet nuts, threaded inserts, and threadable inserts, as anchors for threaded fasteners in a number of different applications, including thin wall applications, such as sheet metal, which may be too thin to be tapped with threads. In many such cases there is access only to one side of the workpiece. In general, the workpiece is drilled or punched and the anchor device is placed within the resulting hole by an installation tool. With the known installation tools, when the tool is activated, a portion of the anchor device on the blind side of the workpiece, such as a sleeve portion, is deformed to create an enlargement which prevents removing the insert from the hole. After the installation tool is remove, a threaded fastener may be inserted into a threaded portion of the insert.

Installation tools for setting nut inserts, particularly in blind applications, are known. These tools generally comprise a tool body from which extends a stud member having external threads. A pull rod is connected to the rear of the stud member, where the pull rod is connected to means within the tool body for reciprocating the stud member. The stud member typically extends through a nose piece which is connected to the front of the tool body. There are means within the tool body for rotating the stud member. An insert is screwed onto the external threads of the stud member, and the stud member made up into the insert until a flange on the end of the insert abuts the front end surface of the nose piece. The insert is thereafter placed within an aperture in the workpiece until the flange abuts the first side of the workpiece. The pull rod is then retracted rearwardly a predetermined stroke so as to expand a tubular portion of the insert which is on the second side of the workpiece. The linear force on the insert causes the sleeve of the insert to plastically deform, such that the expanded portion, sometimes referred to as the "bubble", is larger than the diameter of the aperture, preventing withdrawal of the insert from the aperture. Examples of such tools may be found in U.S. Pat. Nos. 4,070,889; 4,368,631; 4,612,793; 4,574,612; 5,605,070; and 6,272,899.

It is desirable that the anchor device resist spinning or rotating within the aperture in the workpiece. One known means of preventing rotation of the anchor device within the hole of the workpiece is to make the hole in a shape other than round, such as octagonal, and to use an insert having a sleeve which has a corresponding shape, such that the sleeve is locked within the hole to prevent rotation, as the corners of the sleeve lock into corresponding corners of the hole. However, installing non-round openings in the workpiece and manufacturing inserts having other than a round shape is more costly than installing round openings in the workpiece and manufacturing round inserts.

SUMMARY OF THE INVENTION

The present invention is directed to an insert installation system and method which meet the needs identified above. The disclosed apparatus is a system for installing an insert within an aperture in a workpiece, the workpiece having a first side and a second side. The insert is the type in which a portion of the insert plastically deforms on the second side of the workpiece upon application of a linear force provided by a tool, thereby preventing withdrawal of the insert from the aperture. The insert comprises a sleeve member and an integral flange, where the flange has a larger diameter than the aperture.

The disclosed installation system performs two actions. It causes the expansion of the sleeve and it also causes the flange of the insert to be fused or welded to the first side of the workpiece. The welded connection between the insert and the workpiece prevents any rotation or spinning of the insert within the workpiece, and increases the integrity of the insert-fastener connection.

The system comprises a tool body with a nose piece attached to the front of the tool body. Insert attachment means extend through the nose piece of the tool body. Reciprocation means contained within the tool body are connected to the insert attachment means, which, by the application of linear force, cause the sleeve of the insert to expand, or plastically deform, as the insert attachment means is retracted within the nose piece into the tool body. A first electrode is attached to the nose piece. The system further comprises a second electrode for connecting to the workpiece. Current generation means are connected to the first electrode and the second electrode for creating an electrical current between the first electrode and the second electrode. The system comprises activation means for activating the reciprocation means and the current generation means.

Typically, a portion of the tool body, such as a threaded stud, provides the insert attachment means. The insert attachment means engages the sleeve member of the insert, such as by making up the threaded stud into internal threads within the sleeve of the insert. The insert is then placed within the aperture until the flange of the insert abuts the first side of the work piece, and the face of the nose piece abuts the flange on the other side. Upon activation, the reciprocation means connected to the insert attachment means cause the insert attachment means to be withdrawn into the tool body. At the same time, the nose piece of the installation tool, which abuts the flange of the insert, prevents movement of the flange. As the insert attachment means are reciprocated into the tool body and the insert is prevented from moving by the nose piece engaging the flange, a linear force is applied to the tubular sleeve of the insert on the blind side of the workpiece, plastically deforming a portion of the sleeve into a bubble or secondary flange larger than the diameter of the hole in the workpiece. This bubble prevents withdrawal of the insert from the hole. The current generation means is activated either before or after formation of the bubble, fusing the flange of the insert to the first side of the workpiece.

These and other features, aspects, and advantages of the present invention will become better understood with regard to the following description, appended claims, and accompanying drawings.

DETAILED DESCRIPTION OF THE EMBODIMENTS

Figure 1:
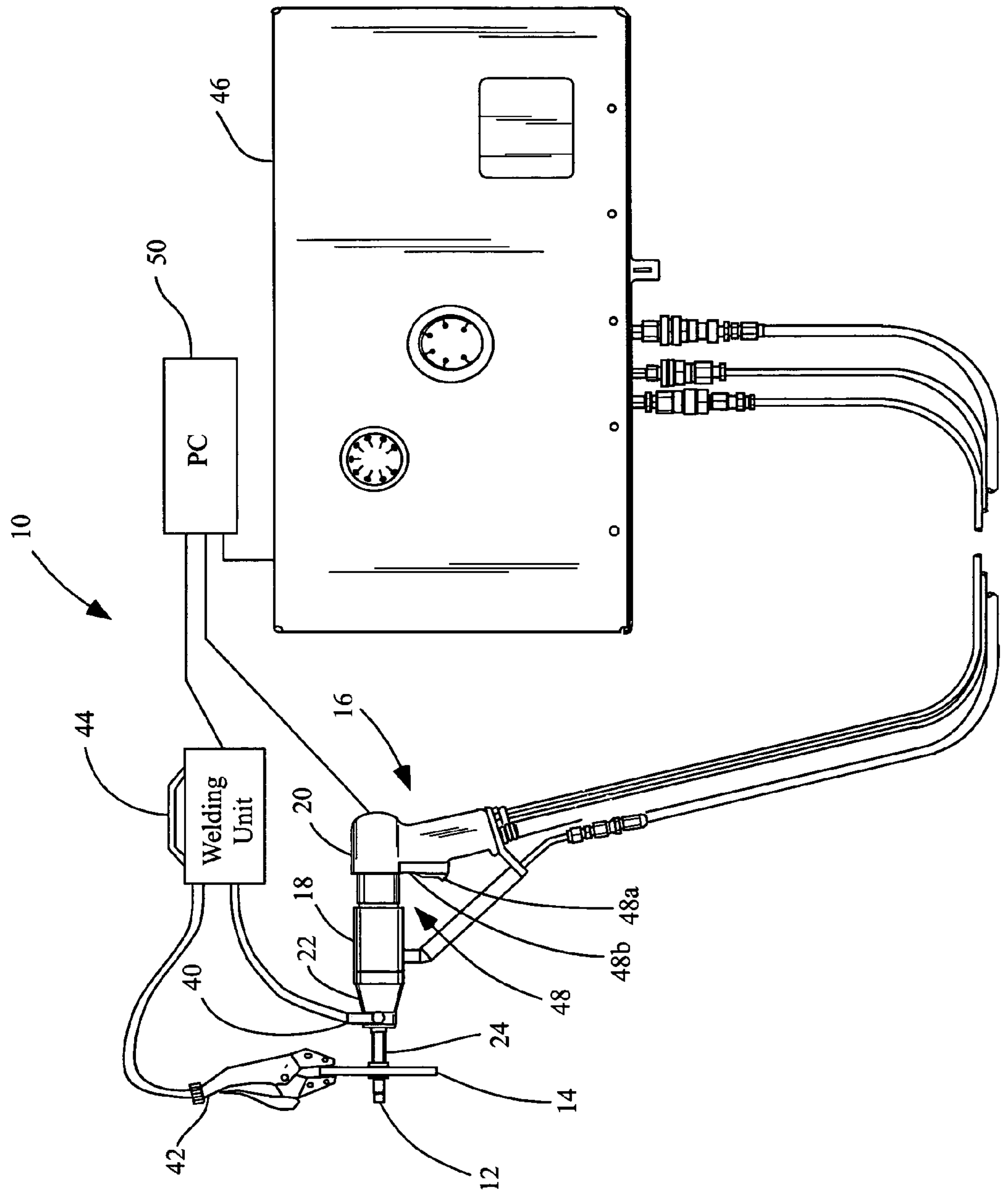
FIG. 1 is a side view of one variety of the disclosed installation system, shown installing a threaded insert into a workpiece.

Referring now specifically to the drawings, FIG. 1 shows one embodiment of the installation system 10 installing an insert 12 to a workpiece 14. The installation system comprises a tool body 16. The tool body 16 comprises a linear pull housing 18 and a motor section 20. The motor section 20 may comprise an air gun or other drive means known in the art, such as an electrical or hydraulic motor. Hereinafter, the uninstalled insert is referred to herein as 12 and the installed insert is referred to herein as 12'.

Figure 2:
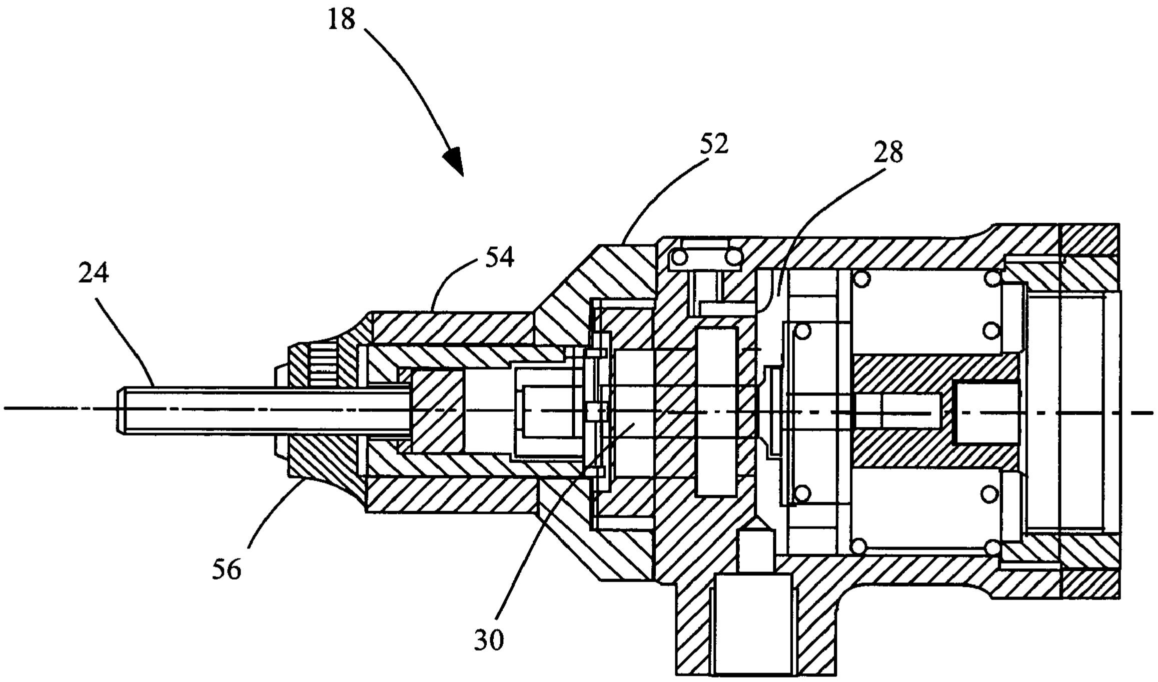
FIG. 2 is sectional view generally depicting the forward section of the body of a typical installation tool.

The tool body 16 may be in the configuration of a gun, as shown in FIG. 1, for handling ease and convenience. A nose piece 22 is attached to the linear pull housing 18. The insert 12 is connected to insert attachment means, such as threaded stud 24. If a threaded stud 24 is used as the insert attachment means, the threaded stud engages internal threads 26 of the insert 12. Reciprocation means contained within the tool body 16, such as the piston 28 shown in FIG. 2, act to either extend the insert attachment means from the linear pull housing 18 through the nose piece 22 or to withdraw the insert attachment means into the linear pull housing through the nose piece 22. The motor section 20 may provide a means of rotation to the insert attachment means by means of a drive shaft operably connected to a shaft in the linear pull housing, such as the square drive 30 shown in FIG. 2. The means of rotation allows the user to quickly make up the threaded stud 24 into the internal threads 26 of the insert 12. Similarly, once the insert 12' has been set within the workpiece 14, the means of rotation allow the user to quickly back the threaded stud 24 out of the internal threads 26 of the insert.

Figure 4:
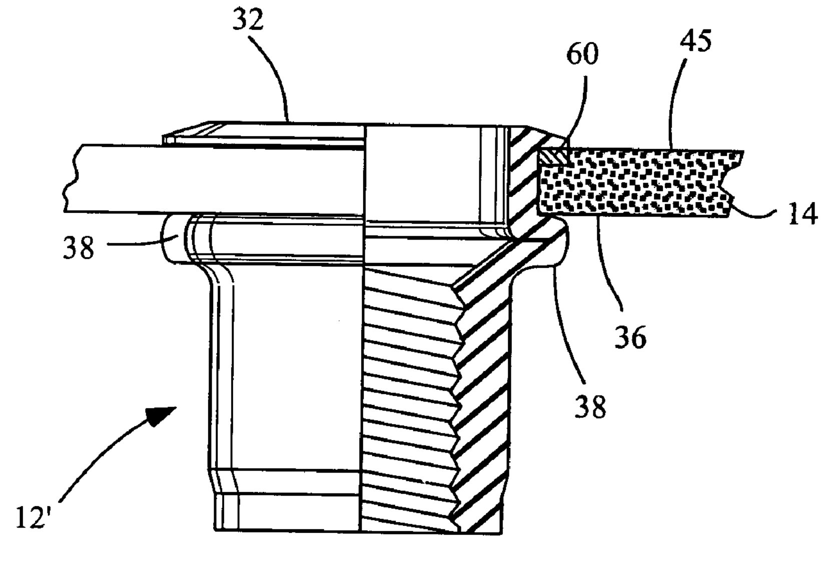
FIG. 4 shows a quarter sectional view of an embodiment of the threaded insert shown in FIG. 2 after being compressed and welded to the workpiece.

As the insert attachment means are withdrawn into the linear pull housing 18 of the tool body 16, the insert 12 is prevented from moving by the nose piece 22 engaging the face of flange 32. As the insert attachment means is withdrawn further, a portion of the tubular sleeve 34 of the insert 12 on the second side (or blind side) 36 of workpiece 14 is plastically deformed into a bubble 38 or secondary flange larger than the diameter of the hole in the workpiece. The bubble 38 prevents withdrawal of the insert 12' from the hole. FIG. 4 shows an insert 12' after it has been installed in workpiece 14 and the bubble 38 has been formed on the second side 36 of the workpiece 14.

As further shown in FIG. 1, a first electrode 40 is attached to nose piece 22 with fastening means, such as a bolt made up into matching threads in the nose piece. A second electrode 42 may connected to the workpiece 14 with clamping means, allowing for the second electrode to be quickly connected and released from the workpiece. The first electrode 40 and second electrode 42 are connected at their respective opposite ends to current generation means 44. The current generation means 44 may be activated nearly simultaneously with the activation of the reciprocation means, and may be activated either before or after activation of the reciprocation means. The current generation means 44 creates current flow between the first electrode 40 and the second electrode 42, causing the underside of the flange 32 of the insert 12 to be fused (i.e., welded) to the first side 45 of the workpiece 14.

The current generation means 44 may be those commonly known in the art for welding purposes, such as a welding machine. In particular, resistance welding equipment may be used. One specific variety of resistance welding machine is a capacitor discharge welding machine. Capacitor discharge welding, also sometimes referred to as pulse welding, is a form of resistance welding where the fused connection is achieved within milliseconds at very high current levels by utilizing energy stored in a capacitor battery or bank. In general, in the capacitor discharge welding process, electrodes are attached to the workpieces to be joined, and an extremely short pulse is provided. This very short energy pulse heats the surfaces of both components to be welded to a plastic state, thus avoiding the mixing and creation of undesired alloys at the weld interface. The workpieces generally show no distortion or dimensional changes after the capacitor discharge welding process. Among the other known welding processes, capacitor discharge welding has the advantage that the welding machine is a relatively small unit which fits on a table top or portable stand and is fairly easy to transport.

The reciprocation means may be powered by pneumatic control means, such as air compressor 46. Some installation tools use air pressure from an air compressor to activate a hydraulic piston within the tool for operating the reciprocation means, such that the reciprocation means are powered by hydraulic means. The installation system further comprises activation means for activating the reciprocation means and the current generation means 44. As shown in FIG. 1, the activation means may comprise a trigger 48 attached to the motor section 20. The trigger 48 may directly engage the reciprocation means, as known for existing insert installation tools, by activating a valve and allowing air flow into the tool body 16. Alternatively, the trigger 48 may comprise an electrical contact which either opens or closes (i.e., "activated") upon manipulation of the trigger. The installation system may further comprise processing means, such as a programable controller 50 which is capable of receiving input signals and generating output signals. Trigger 48 may be electrically connected to the programable controller 50, such that activation of the trigger and opening or closing of the electrical contact initiates a command sequence by the programable controller 50 with output signals being provided to various end devices. For example, upon activation of the trigger 48, the programable controller 50 might provide an output signal to the pneumatic control means, such as air compressor 46, to provide air pressure to the reciprocation means, thereby causing the sleeve 34 of insert 12 to be plastically deformed to form bubble 38. Following a designated time interval, the programable controller 50 may then provide an output signal to current generation means 44, causing a current to be applied between the first electrode 40 and the second electrode 42, causing the underside of the flange 32 of the insert 12 to be fused to the first side 45 of the workpiece 14. Of course, this sequence may be reversed by simple changes in the logic of the programable controller 50.

Alternatively, the installation system may comprise separate activation means respectively for the pneumatic control means and the current generation means. For example, a first trigger 48*a* may be attached to the tool body 16 which activates the reciprocation means and a second trigger 48*b* attached to the tool body which activates the current generation means 44. First trigger 48*a* and second trigger 48*b* may each respectively comprise a first electrical contact and a second electrical contact, each which either opens or closes upon manipulation of each of the triggers. The first electrical contact may then be electrically connected to the pneumatic control means, such that the pneumatic control means is activated when the first electrical contact is activated by manipulation of the trigger. Similarly, the second electrical contact may electrically connected to the current generation means 44, such that the current generation means is activated when the second electrical contact is either opened or closed upon manipulation of the trigger. It is to be appreciated that first trigger 48*a* and second trigger 48*b* may comprise a single dual-action trigger, which is activated by pressing a trigger member at different locations on the member. For example, the first trigger 48*a* may be activated by pulling at the top of the member and the second trigger 48*b* may be activated by pulling at the bottom of the member. It is also possible that the first trigger 48*a* may operate an air valve while second trigger 48*b* operates an electrical contact, or first trigger 48*a* may operate an electrical contact while second trigger 48*b* operates an air valve.

The nose piece 22 may have different members or segments, such as a rear member 52 adjacent to the linear pull housing 18, an intermediate member 54 adjacent to the rear member, and a front member 56 adjacent to the intermediate member. The first electrode 40 is then attached to the front member 56 with fastening means, such a bolt and matching threads tapped in the front member. The intermediate member 54 comprises an insulation material, which may comprise DELRIN® or other thermoplastic material. The rear member 52 may comprise aluminum and the front member 56 comprises a conductive material such as copper or copper alloy adjacent to the intermediate member, the first electrode 40 attached to the front member.

Figure 3:
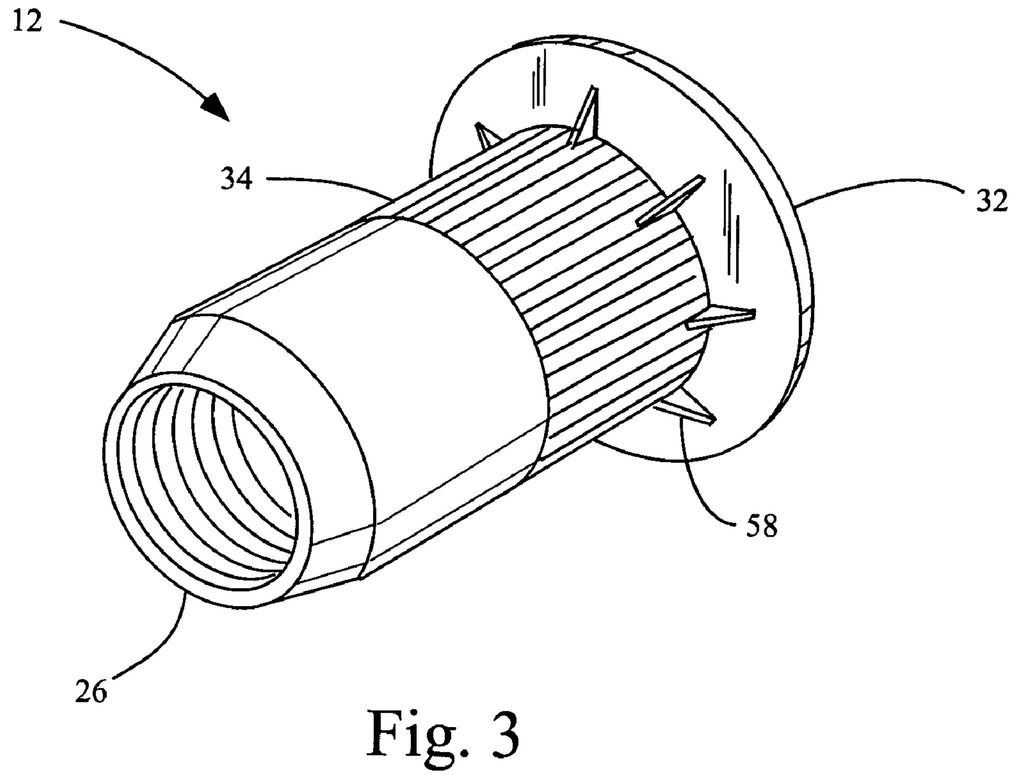
FIG. 3 is a perspective view of an insert prior to installation of the insert.

One insert 12 for use with the disclosed installation system is shown in FIG. 3. The insert 12 has one or more protrusions 58 on the underside of flange 32. When the sleeve 34 of insert 12 is placed within the aperture of the workpiece 14, the flange 32 is abutted against the first side 45 of the workpiece 14, such that the flange 32 is sandwiched between the first side 45 on one side and the front member 56 of the nose piece 22 on the other. Upon activation of the current generation means 44, the protrusions 58 are fused to the first side 45 of the workpiece, forming one or more welded connections 60 between the insert 12 and the workpiece 14. The welded connection 60 prevents the installed insert 12' from spinning within the workpiece, and provides a more secure anchor for a fastener installed within the insert.

An alternative insert may also be used. While the flange 32 would substantially remain the same, this insert would have a stud pre-installed in sleeve 34, and a female adapter would be attached to threaded stud 24 for connecting to the stud and insert to the tool body 16. Except for the means of attaching the insert to the tool body 16, operation of the installation system 10 would remain substantially the same.

It is to be appreciated that there are a number of known different insert installation tools, having different internal mechanisms or other features. The present invention may be used with the known insert installation tools by attaching a first electrode 40 to a current conducting nosepiece on the tool. The current generation means may be activated by either modifying the existing trigger of the tool so that it activates the welding machine. As an alternative, the current generation means may be activated by the controls on the unit itself.

A method of attaching fasteners to a workpiece having a first side and a second, and an existing aperture in the workpiece is also disclosed. One embodiment of the method comprises the steps of attaching the insert 12 to a tool body 16 of the installation system disclosed herein, where the insert is made up to insert attachment means extending from the nose piece 22 of the tool body 16 such that the flange 32 of the insert is adjacent and abutting the nose piece. The second electrode 42 is connected to the workpiece 14. The insert 12 is inserted into the aperture of the workpiece 14, such that the inside face of flange 32 is immediately adjacent and touching the first side 45 of the work piece, and the outside face is adjacent and abutting the front of the nose piece 22 of the tool body 16. The activation means of the installation system 10 are engaged, whereby a portion of the sleeve 34 on the second side 36 of the work piece is enlarged by the reciprocation means and the flange 32 is fused to the first side 45 by the current generation means 44. The insert attachment means is thereafter disengaged from the installed insert 12'.

These and other features, aspects, and advantages of the present invention will become better understood with regard to the following description, appended claims, and accompanying drawings. While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. An installation system for installing an insert within an aperture in a workpiece, the workpiece having a first side and a second side, the insert being of the type in which a portion of the insert plastically deforms on the second side of the workpiece upon application of a linear force, the installation system comprising:

a tool body;

a nose piece attached to the tool body;

insert attachment means extending from the nose piece;

reciprocation means contained within the tool body connected to the insert attachment means;

a first electrode attached to the nose piece;

a second electrode for connecting to the workpiece;

current generation means connected to the first electrode and the second electrode for creating an electrical current between the first electrode and the second electrode; and activation means for activating the reciprocation means and the current generation means.

2. The installation system of claim 1 wherein the insert attachment means comprises a threaded stud.

3. The installation system of claim 1 wherein the current generation means comprises a capacitor discharge welding machine.

4. The installation system of claim 1 wherein the current generation means comprises a resistance welding machine.

5. The installation system of claim 1 wherein the activation means comprises a trigger attached to the tool body, the trigger comprising an electrical contact which is activated upon manipulation of the trigger.

6. The installation system of claim 5 wherein the reciprocation means is pneumatically connected to pneumatic control means.

7. The installation system of claim 6 wherein the electrical contact is electrically connected to processing means, the processing means capable of receiving input signals and generating output signals.

8. The installation system of claim 1 wherein the activation means comprises a trigger attached to the tool body, the trigger operating an air valve.

9. The installation system of claim 7 wherein the processing means is electrically connected to the current generation means and to the pneumatic control means.

10. The installation system of claim 9 wherein the processing means, upon activation of the electrical contact, provides an output signal to the current generation means and to the pneumatic control means.

11. The installation system of claim 1 wherein the nose piece comprises a rear member adjacent to the tool body, an intermediate member adjacent to the rear member, the intermediate member comprising an insulation material, and a front member adjacent to the intermediate member, the first electrode attached to the front member.

12. The installation system of claim 11 wherein the rear member comprises aluminum.

13. The installation system of claim 11 wherein the front member comprises copper.

14. The installation system of claim 11 wherein the front member comprises copper alloy.

15. The installation system of claim 11 wherein the intermediate member comprises a thermoplastic material.

16. An installation system for installing an insert within an aperture in a workpiece, the workpiece having a first side and a second side, the insert being of the type in which a portion of the insert plastically deforms on the second side of the workpiece upon application of a linear force, the installation system comprising:

a tool body;

a nose piece attached to the body;

insert attachment means extending from the nose piece;

reciprocation means contained within the tool body connected to the insert attachment means;

a first electrode attached to the nose piece;

a second electrode for connecting to the workpiece;

current generation means connected to the first electrode and the second electrode for creating an electrical current between the first electrode and the second electrode;

a first activation means for activating the reciprocation means; and a second activation means for activating the current generation means.

17. The installation system of claim 16 wherein the insert attachment means comprises a threaded stud.

18. The installation system of claim 16 wherein the current generation means comprises a capacitor discharge welding machine.

19. The installation system of claim 16 wherein the current generation means comprises a resistance welding machine.

20. The installation system of claim 16 wherein the first activation means comprises a first trigger attached to the tool body, the first trigger comprising a first electrical contact which is activated upon manipulation of the first trigger.

21. The installation system of claim 20 wherein the reciprocation means is pneumatically connected to pneumatic control means.

22. The installation system of claim 21 wherein the first electrical contact is electrically connected to the pneumatic control means, wherein the pneumatic control means is activated when the first electrical contact is activated.

23. The installation system of claim 16 wherein the second activation means comprises a second trigger attached to the tool body, the second trigger comprising a second electrical contact which is activated upon manipulation of the second trigger.

24. The installation system of claim 23 wherein the second electrical contact is electrically connected to the current generation means, wherein the current generation means is activated when the second electrical contact is activated.

25. The installation system of claim 16 wherein the first activation means comprises a first trigger attached to the tool body, the a first trigger connected to an air valve which operates upon manipulation of the first trigger.

26. The installation system of claim 25 wherein the air valve is connected to the pneumatic control means, wherein the pneumatic control means is activated when the air valve is operated.

27. The installation system of claim 16 wherein the nose piece comprises a rear member adjacent to the body, an intermediate member adjacent to the rear member, the intermediate member comprising an insulation material, and a front member adjacent to the intermediate member, the first electrode attached to the front member.

28. The installation system of claim 27 wherein the rear member comprises aluminum.

29. The installation system of claim 27 wherein the front member comprises copper.

30. The installation system of claim 27 wherein the front member comprises copper alloy.

31. The installation system of claim 27 wherein the intermediate member comprises a thermoplastic material.

32. An installation system for installing an insert within an aperture in a workpiece, the workpiece having a first side and a second side, the insert being of the type in which a portion of the insert plastically deforms on the second side of the workpiece upon application of a linear force, the installation system comprising:

a tool body, comprising a linear pull housing connected to a motor section;

a nose piece attached to the linear pull housing;

insert attachment means extending from the nose piece;

reciprocation means contained within the tool body connected to the insert attachment means;

a first electrode attached to the nose piece;

a second electrode for connecting to the workpiece;

current generation means connected to the first electrode and the second electrode for creating an electrical current between the first electrode and the second electrode; and activation means for activating the reciprocation means and the current generation means.

33. The installation system of claim 32 wherein the insert attachment means comprises a threaded stud.

34. The installation system of claim 32 wherein the current generation means comprises a capacitor discharge welding machine.

35. The installation system of claim 32 wherein the current generation means comprises a resistance welding machine.

36. The installation system of claim 32 wherein the activation means comprises a trigger attached to the tool body, the trigger comprising an electrical contact which is activated upon manipulation of the trigger.

37. The installation system of claim 36 wherein the reciprocation means is pneumatically connected to pneumatic control means.

38. The installation system of claim 37 wherein the electrical contact is electrically connected to processing means, the processing means capable of receiving input signals and generating output signals.

39. The installation system of claim 38 wherein the processing means is electrically connected to the current generation means and to the pneumatic control means.

40. The installation system of claim 39 wherein the processing means, upon activation of the electrical contact, provides an output signal to the current generation means and to the pneumatic control means.

41. The installation system of claim 32 wherein the first activation means comprises a first trigger attached to the tool body, the a first trigger connected to an air valve which operates upon manipulation of the first trigger.

42. The installation system of claim 41 wherein the air valve is connected to the pneumatic control means, wherein the pneumatic control means is activated when the air valve is operated.

43. The installation system of claim 32 wherein the nose piece comprises a rear member adjacent to the linear pull housing, an intermediate member adjacent to the rear member, the intermediate member comprising an insulation material, and a front member adjacent to the intermediate member, the first electrode attached to the front member.

44. The installation system of claim 43 wherein the rear member comprises aluminum.

45. The installation system of claim 43 wherein the front member comprises copper.

46. The installation system of claim 43 wherein the front member comprises copper alloy.

47. The installation system of claim 43 wherein the intermediate member comprises a thermoplastic material.

48. A method for installing an insert within an aperture in a workpiece, the insert comprising a sleeve member and an integral flange, the flange having a larger diameter than the aperture and the workpiece having a first side and a second side, the method comprising:

(a) attaching the insert to a tool body, the flange adjacent to a nose piece attached to the tool body, the tool body being one component of an insert installation system comprising: (i) the tool body; (ii) the nose piece attached to the body; (iii) insert attachment means extending from the nose piece; (iv) reciprocation means within the tool body connected to the insert attachment means; (v) a first electrode attached to the nose piece; (vi) a second electrode for connecting to the workpiece; (vii) current generation means connected to the first electrode and the second electrode for creating an electrical current between the first electrode and the second electrode; and (vii) activation means for activating the reciprocation means and the current generation means;

(b) attaching the second electrode to the workpiece;

(c) inserting the insert into the aperture until the flange of the insert is sandwiched between and touching the first side of the workpiece on one side and by the nose piece on the other side;

(d) engaging the activation means, whereby a portion of the sleeve on the second side of the work piece is enlarged by the reciprocation means and the flange is fused to the first side by the current generation means; and (e) disengaging the insert attachment means from the installed insert.

49. A method for installing an insert within an aperture in a workpiece, the insert comprising a sleeve member and an integral flange, the flange having a larger diameter than the aperture and the workpiece having a first side and a second side, the method comprising:

(a) attaching the insert to a tool body, the flange adjacent to a nose piece attached to the tool body, the tool body being one component of an insert installation system comprising: (i) the tool body; (ii) the nose piece attached to the body; (iii) insert attachment means extending from the nose piece; (iv) reciprocation means within the tool body connected to the insert attachment means; (v) a first electrode attached to the nose piece; (vi) a second electrode for connecting to the workpiece; (vii) current generation means connected to the first electrode and the second electrode for creating an electrical current between the first electrode and the second electrode; (vii) a first activation means for activating the reciprocation means; and (viii) a second activation means for activating the current generation means;

(b) attaching the second electrode to the workpiece;

(c) inserting the insert into the aperture until the flange of the insert is sandwiched between and touching the first side of the workpiece on one side and by the nose piece on the other side;

(d) engaging the first activation means, whereby the reciprocation means is activated and a portion of the sleeve on the second side of the work piece is enlarged;

(e) engaging the second activation means, whereby the current generation means is activated and the flange is fused to the first side; and (f) disengaging the insert attachment means from the installed insert.

50. A method for installing an insert within an aperture in a workpiece, the insert comprising a sleeve member and an integral flange, the flange having a larger diameter than the aperture and the workpiece having a first side and a second side, the method comprising:

(a) attaching the insert to a tool body, the flange adjacent to a nose piece attached to the tool body, the tool body being one component of an insert installation system comprising: (i) the tool body; (ii) the nose piece attached to the body; (iii) insert attachment means extending from the nose piece; (iv) reciprocation means within the tool body connected to the insert attachment means; (v) a first electrode attached to the nose piece; (vi) a second electrode for connecting to the workpiece; (vii) current generation means connected to the first electrode and the second electrode for creating an electrical current between the first electrode and the second electrode; (vii) a first activation means for activating the reciprocation means; and (viii) a second activation means for activating the current generation means;

(b) attaching the second electrode to the workpiece;

(c) inserting the insert into the aperture until the flange of the insert is sandwiched between and touching the first side of the workpiece on one side and by the nose piece on the other side;

(d) engaging the second activation means, whereby the current generation means is activated and the flange is fused to the first side;

(e) engaging the first activation means, whereby the reciprocation means is activated and a portion of the sleeve on the second side of the work piece is enlarged; and (f) disengaging the insert attachment means from the installed insert.

* * * * *